United States Patent [19]

Anthony et al.

[11] Patent Number: 4,657,358
[45] Date of Patent: Apr. 14, 1987

[54] COOLED DEFORMABLE MIRROR

[75] Inventors: Frank M. Anthony, Kenmore, N.Y.; Ralph E. Aldrich, Acton; Steven M. Daigneault, Rockland, both of Mass.

[73] Assignees: Itek Corporation, Lexington, Mass.; Textron, Inc., Buffalo, N.Y.

[21] Appl. No.: 768,768

[22] Filed: Aug. 23, 1985

[51] Int. Cl.⁴ .............................................. G02B 5/08
[52] U.S. Cl. .................................. 350/610; 350/607; 350/611; 350/629
[58] Field of Search ................ 350/359, 360, 607–611, 350/613, 623, 629–632

[56] References Cited

U.S. PATENT DOCUMENTS

| | | | |
|---|---|---|---|
| 3,904,274 | 9/1975 | Feinleib et al. | 350/360 |
| 3,909,118 | 9/1975 | Schmidt | 350/610 |
| 3,932,029 | 1/1976 | Weiss | 350/610 |
| 4,143,946 | 3/1979 | Leo et al. | 350/610 |
| 4,202,605 | 5/1980 | Heinz | 350/613 |
| 4,239,343 | 12/1980 | Wrench | 350/611 |
| 4,248,504 | 2/1981 | Albertinetti et al. | 350/360 |
| 4,257,686 | 3/1981 | Albertinetti et al. | 350/360 |
| 4,266,857 | 5/1981 | Svenson | 350/610 |
| 4,443,059 | 4/1984 | Wells | 350/610 |
| 4,552,439 | 11/1985 | Hoag et al. | 350/610 |

Primary Examiner—John Petrakes
Attorney, Agent, or Firm—Michael H. Wallach; Robert F. Rotella

[57] ABSTRACT

A cooled deformable mirror having a continuous mirror surface and a method for cooling a deformable mirror having a continuous mirror surface are disclosed. In the preferred embodiments, one or more enclosed spaces within the mirror's faceplate are supplied with coolant through one or more actuators used to deform the mirror surface and one or more other of the actuators are used to remove coolant from the mirror faceplate. The deformable mirror includes a base manifold which receives coolant from an external source and distributes the coolant to selected ones of the actuators for distribution within the faceplate. Coolant removed from the faceplate by others of the actuators is returned to the base manifold from which it is returned to the external source. Another preferred embodiment further includes a coolant distribution manifold in the faceplate to facilitate the distribution of coolant within the faceplate after the coolant has been delivered to the faceplate by the apertures in one or more actuators. In the preferred embodiments, the coolant is also circulated through spaces within the base manifold to remove heat from the base.

22 Claims, 7 Drawing Figures

COOLED DEFORMABLE MIRROR

The Government has rights in this invention pursuant to Contract No. F29601-84-C-0015 awarded by the Department of the Air Force.

BACKGROUND OF THE INVENTION

1. Field of the Invention

The present invention relates generally to a cooled deformable mirror structure and to a method for cooling a deformable mirror for use as a wavefront phase modulator in optical systems having lasers which generate high energy flux levels. Such systems commonly utilize deformable mirrors to reflect a laser beam in a desired direction and/or to correct the laser beam for wavefront distortions, or to encode the wavefront by introducing known distortions thereto. Because a mirror for use in such applications cannot be constructed to reflect the totality of laser radiation incident thereon, the small portion that is absorbed by the mirror surface can cause thermal overloading of the mirror surface and its supporting structure due to the flux level of the incident laser beam. The absorbed thermal energy results in stresses in the mirror's support structure which can result in unwanted distortion of the surface of the mirror, or the destruction of the mirror surface and its supporting structure.

2. Description of the Prior Art

The use of deformable mirrors for the correction of wavefront phase distortion and for encoding wavefronts by introducing known distortions in a wavefront is known in the prior art. See, for example, U.S. Pat. No. 3,904,274 which issued on Sept. 9, 1975 and U.S. Pat. No. 4,257,686 which issued on Mar. 24, 1981, both of which are incorporated herein by reference. The use of a fluid for cooling mirrors used in laser applications to reduce thermal loads imposed by the laser beam is also known in the art. An example of such a mirror is disclosed in U.S. Pat. No. 3,909,118 which issued on Sept. 30, 1975. Moreover, the use of fluid cooling in deformable mirrors is also known in the prior art as exemplified by U.S. Pat. No. 4,143,946 which issued on Mar. 13, 1979; U.S. Pat. No. 4,202,605 which issued on May 13, 1980; and U.S. Pat. No. 4,239,343 which issued on Dec. 16, 1980.

U.S. Pat. No. 4,143,946 is of interest for its disclosure of a deformable mirror which uses electromagnetic actuators to control the distortion of a continuous faceplate. The coolant is allowed to spread over the rear side of the faceplate after passing through a plurality of nozzles. The extent to which the rear side of the faceplate is cooled is determined by the size of the nozzles, their distance from the faceplate, and the pressure of the cooling fluid.

U.S. Pat. No. 4,202,605 is of interest for its disclosures of a cooled segmented mirror which uses piezo ceramic actuators to dynamically position discrete elements of a mirror. The mirror is constructed from a plurality of discrete mirror elements, each of which is individually positioned by its own piezo ceramic actuator. Coolant is led toward and away from each mirror element through the element's associated actuator. Each actuator is connected via two coolant supply lines to a distribution manifold which distributes and collects the cooling fluid.

U.S. Pat. No. 4,239,343 is of interest for its disclosure of a deformable mirror which includes a conduit composed of thin-wall copper tubing through which coolant may be circulated to cool the deformable mirror. The tubing traverses spaces above a series of spherical piezoelectric actuators which are used to induce localized variations in the shape of the surface of a mirror which is supported by the actuators.

It is known that coolant introduced against the rear surface of a mirror faceplate of a deformable mirror at an excessive pressure will cause vibration and distortion in the mirror structure, which may introduce unacceptable distortions into the laser wavefront reflected from the mirror. However, the pressure at which coolant must be introduced to cool the mirror structure is dependent on both the cross-sectional area and length of the path that the coolant must follow in traveling through the mirror structure, and is also directly related to the quantity of thermal energy that the coolant must absorb. If coolant is circulated through the mirror at a low pressure in an effort to reduce pressure-induced vibration and distortion, the rate at which the coolant is circulated may be insufficient to permit the coolant to absorb a sufficient quantity of thermal energy to prevent excessive heating of the surface of the mirror.

Prior-known cooled deformable mirrors failed to provide a continuous deformable mirror surface in which coolant operating at a low pressure cooled the mirror base and actuators and then traveled only a short distance while cooling the surface of the faceplate. The present invention overcomes this defect by disclosing a deformable mirror apparatus and a method for cooling a deformable mirror in which the mirror's continuous mirror surface is cooled by a coolant operating at a sufficiently low pressure to prevent vibration and distortion induced by the coolant's flow from distorting the laser signal reflected by the mirror. The low coolant pressure is made possible by the short distance that the coolant is required to traverse across the faceplate containing the mirror's reflecting surface.

SUMMARY OF THE INVENTION

Accordingly, it is an object of this invention to provide a deformable mirror in which a cooled, continuous mirror surface may be selectively deformed by a series of actuators attached to the mirror.

A further object of this invention is to provide a cooled deformable mirror in which the coolant which cools the mirror surface also cools the actuators which deform the mirror surface.

A further object of this invention is to provide a cooled deformable mirror in which the coolant used to cool the mirror surface only travels a short distance across the faceplate of the mirror.

A further object of this invention is to provide an efficient arrangement for removing heat from a deformable mirror which avoids the need for circulating coolant through the mirror under high pressure.

A further object of this invention is to provide a method by which the continuous mirror surface and the actuators of a deformable mirror may be cooled by a coolant which travels a short path through the mirror's faceplate.

The foregoing objects are accomplished by providing a mirror faceplate having a mirror surface on one side thereof which may be deformed by selectively energizing one or more of a plurality of actuators fastened between the faceplate and the mirror's supporting base. The actuators have apertures bored completely through the length thereof which are lined with a coolant-impervious dielectric material to permit a coolant to travel through the actuators while being circulated between the faceplate and a manifold in the base. The base manifold includes means for routing coolant toward and away from selected ones of the actuators. In one embodiment, the faceplate is comprised of an upper plate and a lower plate which enclose one or more enclosed spaces through which coolant may circulate. A second embodiment includes a manifold arrangement within the faceplate to further distribute coolant delivered to the faceplate by the actuators. In each embodiment, coolant is introduced into the base manifold from an external source and is channeled through selected ones of the actuators toward the enclosed spaces in the faceplate. The coolant absorbs heat conducted into the mirror structure from the impinging laser beam and is directed toward other ones of the actuators which drain the coolant away from the faceplate and into the base manifold. The coolant is collected at the base manifold and thereafter may be recycled through the mirror after the heat is removed from the coolant. The use of the actuators to channel coolant toward and away from the faceplate eliminates the need for heavy edge manifolding around the edge of the faceplate, thus eliminating the edge stiffness frequently associated with prior-known techniques for cooling deformable mirror faceplates.

BRIEF DESCRIPTION OF THE DRAWINGS

The foregoing objects and advantages of the present invention may be more readily understood upon examination of the detailed description of the preferred embodiments when read in conjunction with the accompanying drawings in which:

FIG. 2 is an exploded perspective view of the unassembled components of a cooled deformable mirror similar to the mirror shown in FIG. 1, but having a limited number of actuators to deform the faceplate;

DETAILED DESCRIPTION OF PREFERRED EMBODIMENTS

Figure 1:
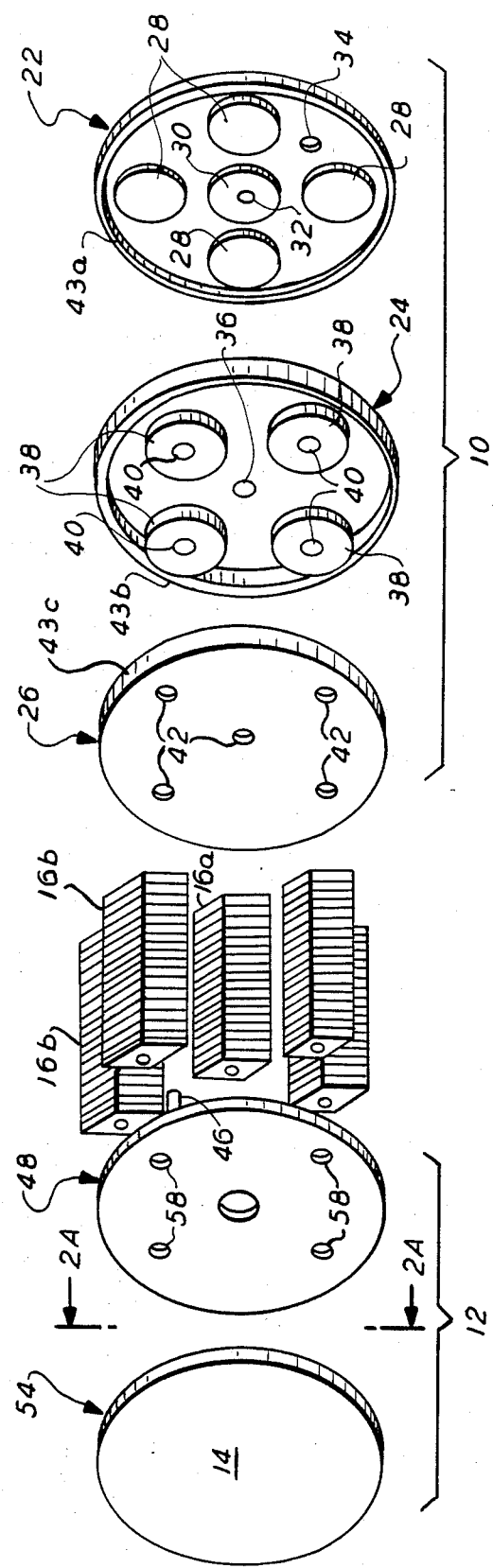
FIG. 1 is a perspective view of a cooled deformable mirror constructed in accordance with the teachings of this invention.
Figure 1:
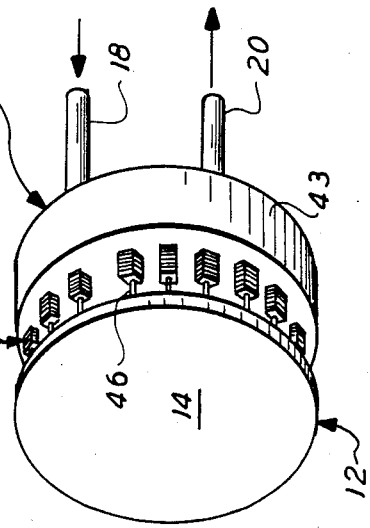

Referring now to the drawings, FIG. 1 shows a first embodiment of a cooled deformable laser mirror constructed in accordance with the teachings of the present invention. The mirror includes a base manifold which is shown generally at 10 and a mirror faceplate which is shown generally at 12. The faceplate 12 includes a reflecting surface 14 on one side thereof which is polished and/or coated to permit an impinging laser beam to be reflected therefrom. The faceplate 12 is connected to and supported away from the base manifold 10 by a plurality of actuators 16. Coolant is moved toward and away from the base manifold 10 by lines 18 and 20 respectively which may be rigid or flexible tubes and which may be connected to the base manifold 10 in any conventional manner.

FIG. 2 shows that the preferred embodiment of the base manifold 10 is comprised of a lower baseplate 22, an upper baseplate 24 and a coverplate 26. The lower baseplate 22 includes a plurality of posts 28 which, as seen from FIG. 4, serve in part to support the upper baseplate 24. As is best noted in FIGS. 3 and 4, post 30 has an aperture 32 therethrough to permit coolant to be introduced into the base manifold 10. The lower baseplate 22 includes an aperture 34 which permits cooling fluid to be drained away from the base manifold 10. The upper baseplate 24 overlies the lower baseplate 22 and is supported by the posts 28 and the post 30. Plate 24 includes an aperture 36 which is aligned with aperture 32 in post 30 to permit coolant to pass therethrough. Upper baseplate 24 also includes a plurality of posts 38 having apertures 40 therethrough. Upper baseplate 24 is capped by base manifold coverplate 26 which rests upon and is supported by the posts 38. The base manifold coverplate 26 includes a plurality of apertures 42 which permit coolant to pass into the actuators 16. The base manifold 10 includes an outer wall 43 which encircles the manifold and which may be comprised respectively of the outer wall 43a of the lower baseplate 22, outer wall 43b of upper baseplate 24 and outer wall 43c of coverplate 26. The wall 43 prevents fluid from escaping from the manifold 10.

The dimensions of the lower baseplate 22, upper baseplate 24 and base manifold coverplate 26 are chosen so that when assembled the components comprise a rigid base for the actuators 16 and faceplate 12 and to not flex under the load imposed by the actuators 16 when the actuators are elongated. For a three-inch diameter mirror surface, the preferred thickness of the combination of the lower baseplate 22 and posts 28 is approximately one inch; the preferred thickness of the combination of the upper baseplate 24 and posts 38 is also approximately one inch; and the preferred thickness of the base manifold coverplate 26 is approximately one-half inch.

In the preferred embodiment disclosed herein, each actuator 16 is comprised of a stack of piezo-electric material having individual layers 44 which are separated from each other by interleaved electrodes. A preferred example of how such an actuator may be constructed may be had by reference to U.S. Pat. No. 4,257,686 which issued on Mar. 24, 1981 and which is owned by one of the assignees of the present invention and the teachings of which are incorporated herein by reference. While the aforementioned patent discloses actuators made of lead zirconate titanate (PZT), it should be understood that the actuators may be made from any material which can be made to undergo elongation in response to the application of an electrical potential thereto, as for example lead magnesium niobate (PMN) or barium titanate. The actuator block disclosed in the aforementioned U.S. Pat. No. 4,257,686 is cut into individual actuators, each of which may in the preferred embodiment be approximately 0.3 cm wide by 0.3 cm deep and 1.0 cm long. Electrical signals are fed to the actuators 16 in any conventional manner, as for example by the use of the technique disclosed in the aforementioned U.S. Pat. No. 4,257,686 or by the method shown and described in U.S. Pat. No. 3,904,274 which issued Sept. 9, 1975 and which is owned by one of the assignees of the present invention and the teachings of which are incorporated herein by reference.

Localized deformation of the faceplate 12 is accomplished by selectively applying to one or more of the actuators 16 electrical signals which causes the selected actuators to elongate along their length in an amount proportional to the applied signal. The elongated actuators 16 exert a force between the base manifold 10 and the faceplate 12 via the pusher pads 46. In the preferred embodiment, the pusher pads 46 are hollow cylindrical tubes which are extensions of the lower plate 48. The actuators 16 are fastened to both the coverplate 26 and to the pusher pads 46 by any conventional technique which will assure that pressurized coolant passing through the actuators 16 between the base manifold 10 and the faceplate 12 will not leak from the joints. These bonds may be made for example by using a frit bond or an epoxy bond.

Apertures 50 are bored or otherwise formed through the length of the actuators 16 to permit the passage of coolant between the base manifold 10 and the faceplate 12. Preferably the apertures 50 are 1.0 mm to 2.0 mm in diameter and are lined with a liner 52 to prevent coolant from leaking into the actuator layers 44. The liner 52 may be made from any dielectric material which may be coated on the walls of the apertures 50 and which will not short circuit the individual actuator layers 44. For example, an aperture 50 may be filled with a dielectric material such as epoxy or urethane which is then allowed to drain from the aperture while leaving behind a dielectric coating, or a dielectric glass frit may be used to coat the walls of the aperture and the excess blown out before the actuator 16 is fired to cure the frit and bond it to the wall of the aperture 16. The liner 52 is chosen so that its modulus of elasticity matches or is less than that of the actuator layers 44 so that the liner 52 elongates at the same rate as the actuator 16 when a signal is applied to the actuator 16. A preferred example of a liner 52 for use with a PZT actuator is polyurethane.

Figure 2A:
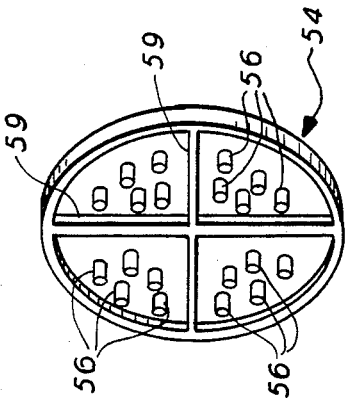
FIG. 2A is a view of the underside of the upper plate of the faceplate of FIG. 2.
Figure 3:
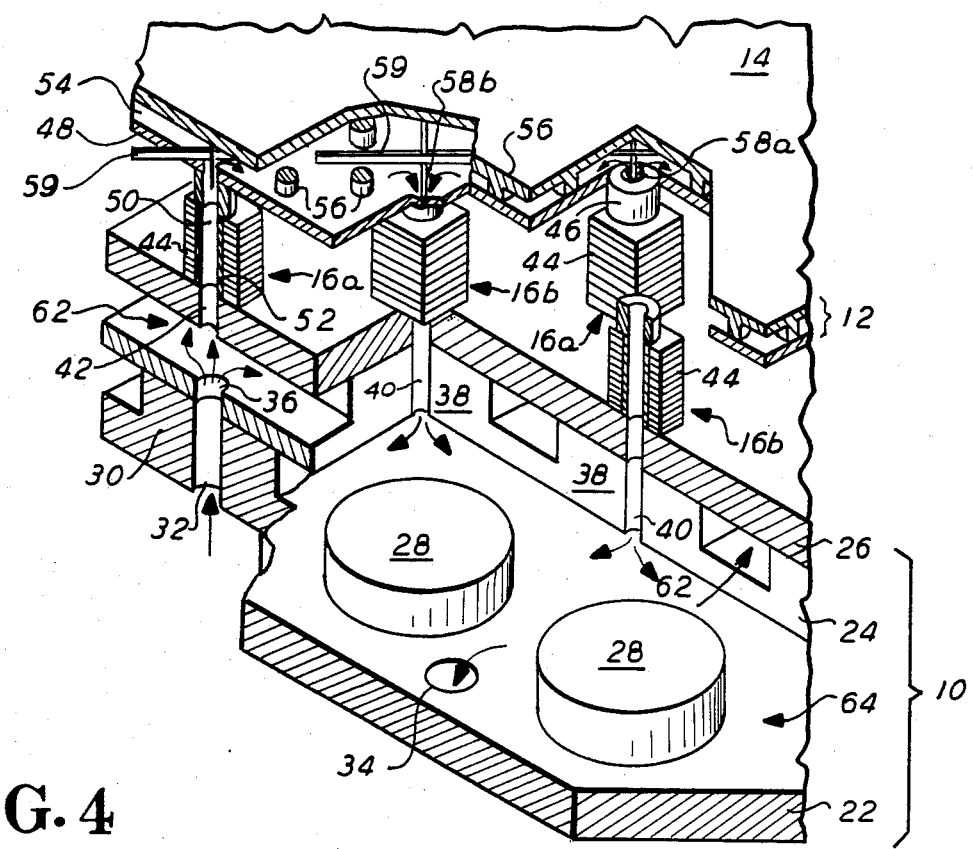
FIG. 3 is a perspective view partly in section showing an interior view of a portion of a cooled deformable mirror.

The faceplate 12 is comprised of the aforementioned lower plate 48 and an upper plate 54. FIG. 3 shows that the upper plate 54 is separated from the lower plate 48 by a plurality of posts 56 which may be formed integral with the upper plate 54 or cemented thereto. The posts 56 serve to provide structural continuity between the plate 48 and the plate 54 and enhance the transfer of heat from the mirror surface to the coolant. Apertures 58 are formed in the lower plate 48 which are coincident with the locations of the pusher pads 46. The apertures 58 permit the coolant to flow to and from the actuators 16 into and out of the spaces between the upper plate 54 and lower plate 48. FIGS. 2A and 3 best illustrate that the upper plate 54 may include a plurality of intersecting webs 59. The webs 59 are used to stiffen the upper plate 54 and to create coolant boundaries to limit the flow of coolant across defined areas within the faceplate 12. The amount of contiguous space enclosed within each set of webs 59 defining an enclosed boundary is determinative of the area of the faceplate 12 that a given quantity of coolant will be required to traverse and to cool. This area is determined experimentally to insure that the coolant pressure required to cool the largest enclosed space within the faceplate 12 will not introduce intolerable vibrations into the mirror surface 14. It is to be understood that for mirrors having small-diameter active areas or for mirrors used in applications where the incident radiation flux density does not produce intense heating of the mirror surface, it is possible within the scope of the teachings of this invention to have only one enclosed area within the mirror faceplate 12 through which coolant circulates, and such enclosed area can have more than one aperture 58 providing coolant to and removing coolant from the enclosed area. It is also possible and within the scope of this invention to use webs which do not totally enclose spaces in the faceplate 12, thereby permitting the circulation of coolant throughout the faceplate 12 even if one or more of the apertures 58 become plugged up or are otherwise unable to transfer coolant toward or away from the faceplate 12. In a preferred embodiment, when the enclosed area within the faceplate 12 is divided into more than one enclosed area, the webs 59 may intersect at an aperture 58 (for example, aperture 58b of FIG. 3) so that an actuator 16 may direct coolant toward or remove coolant from more than one enclosed space.

Figure 4:
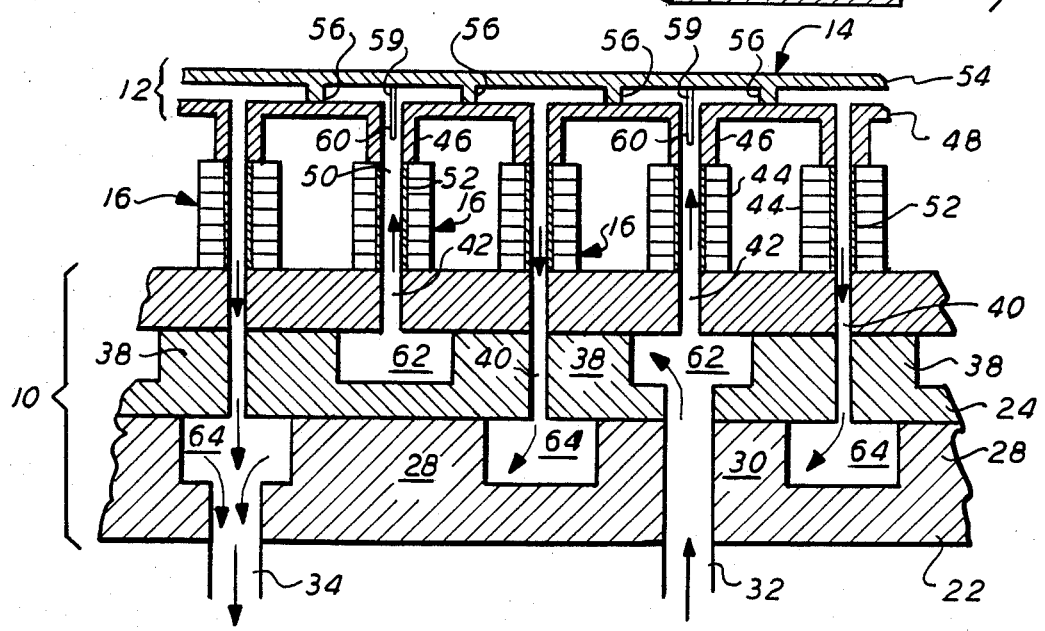
FIG. 4 is a sectional view of a portion of the cooled deformable mirror of FIG. 3.
Figure 5:
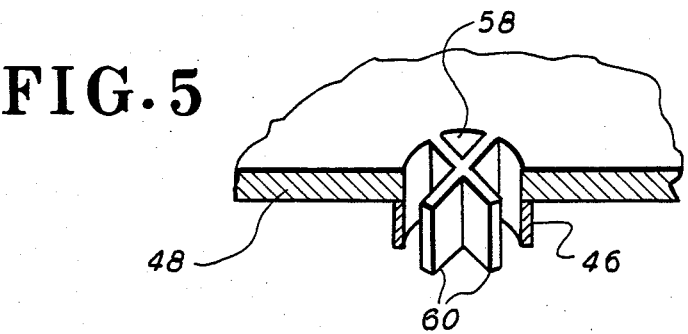
FIG. 5 is a perspective fragmentary view of a pusher pad showing the stiffeners.

FIGS. 4 and 5 best show that the pusher pads 46 may include stiffeners 60 which are aligned with the webs 59 and which are used to stiffen the faceplate in the area of each of the apertures 58. Preferably the stiffeners 60 are formed integral with the pusher pads 46; however, it is also possible to separately fabricate the stiffeners 60 and then fasten them within the pusher pads 46 by any known fastening technique.

The upper plate 54 is bonded to the lower plate 48 to construct the unitary faceplate 12. Preferably this bonding may be achieved by the use of frit or braze bonding techniques which are well known in the art. The faceplate can be manufactured of any material which has a low coefficient of thermal expansion as, for example, from single-crystal or polycrystalline silicon, silicon carbide, carbon-carbon composite or molybdenum.

FIGS. 3 and 4 best illustrate the coolant circulation path within the deformable mirror. Coolant is introduced under pressure into the base manifold 10 via the line 18 and passes through the aperture 32 in post 30 to the spaces 62 between the posts 38 and the upper baseplate 24 and coverplate 26. As is best noted from FIG. 3, alternate rows of actuators act as coolant inlets and outlets. Actuators 16a of FIG. 3 for example, receive coolant from the space 62 via the apertures 42. The coolant passes through apertures 50 in selected ones of the actuators 16 and then through selected ones of the apertures 58, for example aperture 58a of FIG. 3, into enclosed spaces between the lower plate 48 and the upper plate 54 which may be separated from other spaces within the faceplate 12 by the webs 59. The coolant spreads across each space between the lower plate 48 and upper plate 54 from the point where it is introduced. The posts 56 aid in the circulation of the coolant and further aid to conduct heat from the upper plate 54 to the coolant. The pressure of the coolant pumped into the deformable mirror forces the coolant between the lower plate 48 and upper plate 54 and thereafter out of others of the apertures 58, for example aperture 58b of FIG. 3. In traversing the distance between aperture 58a and aperture 58b, the coolant is required to travel but a relatively short distance. As a result, the pressure drop across the distance is small, thereby permitting the coolant to be under lower pressure than if it had to cover a greater surface area, and the amount of heat absorbed by the coolant is less than that which would be required to be absorbed if the coolant were required to travel over a greater surface area.

The coolant is forced away from the faceplate 12 through alternate ones of the actuators (actuators 16b of FIG. 3 for example) and through apertures 42 and 40 into the space 64 between the lower baseplate 22, the upper baseplate 24, the posts 28, and the post 30. In returning away from the faceplate 12 toward the aperture 34, it is to be understood that the coolant is available to absorb additional heat from the actuators 16b and base manifold 10. The coolant circulates within the space 64 between the posts 28 and is forced out of the aperture 34 into the line 20. Lines 18 and 20 may be connected to any form of coolant circulating apparatus as, for example, to a positive displacement pump and an evaporative cooling system (not shown). After the cooling system removes the heat from the coolant, the coolant may be recirculated through the deformable mirror. While the coolant is shown and has been described as entering the deformable mirror through line 18 and exiting through line 20, it is apparent that the direction of flow of the coolant within the mirror could be reversed without departing from the teachings of the present invention.

Figure 6:
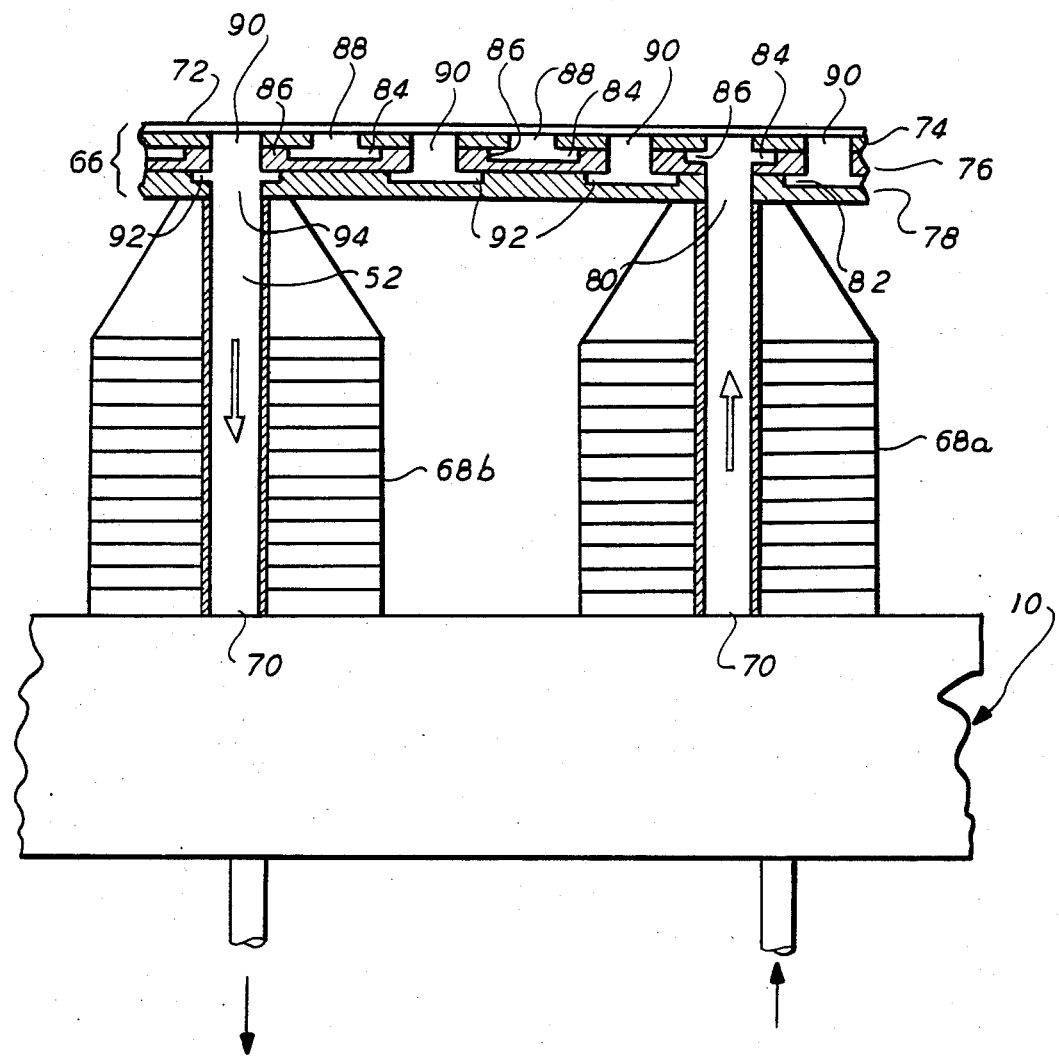
FIG. 6 is a partial sectional view of a second embodiment of a cooled deformable mirror having a faceplate with a coolant distribution manifold integral therewith.

An alternate embodiment of a faceplate for a cooled deformable mirror is shown in FIG. 6. The alternate embodiment may preferably be utilized to cool the faceplate of a deformable mirror having actuators spaced at greater distances between each other than the mirror previously shown and described herein. Upon extending the spacing between adjacent actuators, it will be appreciated that the faceplate must be stiffened by increasing its thickness to reduce bowing of the faceplate between actuators. This also reduces the number of actuators available to deliver coolant to and remove coolant from the faceplate and, consequently, requires that coolant be delivered to the faceplate at a greater pressure to provide the volume of coolant necessary to handle the thermal load absorbed by the faceplate.

The faceplate 66 shown in FIG. 6 is supported above a base manifold 10 (not shown in detail) which is similar in details of construction and operation to the base manifold shown in FIG. 3 by actuators shown generally at 68 which are similar in construction and operation to the actuators 16 also shown in FIG. 3. Alternate ones of the actuators 68 deliver coolant toward the faceplate 66 and others of the actuators 68 drain coolant away from the faceplate 66 through apertures 70 contained within each of the actuators 68.

The faceplate 66 includes a top plate 72 which has a post and web pattern machined into its lower side (not shown in FIG. 6) which is similar to that shown for faceplate 12 in FIGS. 2 and 3. One side of top plate 72 may be polished and/or coated to form a reflective surface. The top plate 72 is fastened to a flow distribution plate 74 which overlies and is fastened to a forward manifold 76. The forward manifold 76 is fastened to and overlies an aft manifold 78 which is fastened to the actuators 68 by any conventional technique, as for example by the use of an epoxy bond. Coolant is distributed within the faceplate 66 in a manner similar to that in which coolant is distributed through the base manifold 10 of FIG. 3. Thus coolant is delivered to the faceplate 66 through the aperture 70 in actuator 68a for example, and then through an aperture 80 in a post 82 of aft manifold 78. The coolant circulates in spaces 84 which are separated by posts 86 formed in the manifold 76. Pressure forces the coolant from the spaces 84 through the apertures 88 in the plate 74 where it is available to cool the top plate 72. After spreading across top plate 72 and removing heat therefrom, the coolant is drained away from the top plate 72 through the apertures 90 into the spaces 92 within the aft manifold 78. Lower apertures 94 permit coolant to circulate between the spaces 92 and the apertures 70 in selected ones of the actuators 68, for example actuator 68b of FIG. 6 to drain the coolant toward the base manifold 10.

Various liquids may be used as the coolant for the structures disclosed herein. For example, it has been found that water can be used as a coolant. In addition, other fluids such as fluorinated hydrocarbon or liquid nitrogen could be substituted as a coolant.

What has been described is a novel structure for a cooled deformable mirror and a method for cooling a deformable mirror in which the coolant is diffused through the mirror base to the mirror faceplate via the actuators used to selectively deform the mirror surface with the coolant traversing a short path across the mirror faceplate. The path followed by the coolant when circulating through the deformable mirror is short and therefore the coolant can be pumped through the structure at a low pressure to prevent inducing high stresses or vibrations in the mirror surface.

While a preferred embodiment of the present invention has been described in detail herein, it is to be understood that many other variations and modifications may suggest themselves to one skilled in the art within the teachings of the present invention. For example, all of the actuators used to deform the mirror faceplate do not have to be used to circulate coolant between the faceplate and the base manifold. While other components, dimensions, materials and configurations may be substituted for those disclosed in the preferred embodiment in order to practice the invention, it is intended that the invention be limited only by the permissible scope of the following claims:

We claim:

1. A cooled deformable mirror having a continuous mirror surface including:
   a. a faceplate having on one side thereof a continuous reflecting surface for reflecting an incident beam of electromagnetic radiation, said faceplate being comprised of an upper plate and a lower plate with one or more enclosed spaces between said upper plate and said lower plate for receiving and containing a coolant for cooling said faceplate, said lower plate including two or more apertures located to allow coolant to enter and leave each of said enclosed spaces between said upper and said lower plates;
   b. two or more actuators fastened to the lower plate of said faceplate to enable said faceplate to be selectively deformed in response to signals applied to said actuators, each of said actuators further including an aperture extending through the length thereof to permit coolant to be delivered through said actuators toward and away from said enclosed spaces in said faceplate, said actuators being positioned with an aperture in each actuator in fluid-communicating relationship with one of said apertures in the lower plate of said faceplate;
   c. a base manifold connected to said apertures in said actuators, said base manifold including means for circulating coolant to an aperture in at least one of said actuators and means for receiving coolant from an aperture in at least another one of said actuators; and d. means for circulating coolant to and away from said base manifold;

whereby said faceplate is cooled by coolant circulating from said base manifold through the aperture in at least one of said actuators into the enclosed spaces between said upper plate and said lower plate of said faceplate and back to said base manifold through an aperture in at least another one of said actuators.

2. The cooled deformable mirror of claim 1 wherein the apertures of said actuators have a coolant-impervious lining along the walls thereof.

3. The cooled deformable mirror of claim 1 wherein one or more of said actuators each transfers coolant toward or away from two or more enclosed spaces in said faceplate.

4. The cooled deformable mirror of claim 1 wherein said base manifold includes at least a first chamber for distributing coolant to said actuators and at least a second chamber for receiving coolant from said actuators after the coolant has cooled said faceplate.

5. The cooled deformable mirror of claim 4 wherein said coolant is water.

6. The cooled deformable mirror of claim 4 wherein said first chamber and said second chamber include posts therein for supporting said actuators.

7. A cooled deformable mirror having a faceplate with a continuous reflective surface on one side thereof, said deformable mirror being comprised of:
a. a base manifold having at least two apertures through which a coolant may be received by said base manifold and removed from said base manifold by an external coolant pump, and at least two other apertures through which a coolant may be transferred from and returned to said base manifold for cooling said faceplate;
b. a faceplate including a front surface containing a continuous mirror surface for reflecting an incident beam of radiation and a rear surface behind said front surface, said faceplate further including at least one enclosed space between said front and rear surfaces and at least a pair of apertures passing through the rear surface of said faceplate and into the enclosed space between said front surface and said rear surface;
c. at least two actuators having bodies manufactured from a material which undergoes elongation along the length of the body when an electrical signal is applied thereto, said actuators being positioned between said base manifold and said faceplate to permit said faceplate to be deformed by applying an electrical signal to said actuators, each of said actuators including an internal aperture along the length thereof to permit coolant to flow through said actuator, said actuators being positioned between said base manifold and the rear surface of said faceplate to permit coolant to flow between said base manifold and said enclosed space in said faceplate through the apertures in said actuators and the apertures in the rear surface of said faceplate, with at least a one of said actuators receiving coolant from said base manifold and directing it toward said enclosed space in the faceplate and at least another one of said actuators receiving coolant from said enclosed space and directing it toward said base manifold after the coolant has passed through said enclosed space.

8. The cooled deformable mirror of claim 7 wherein said base manifold includes one or more cavities which receive coolant and through which the coolant circulates before being directed to the faceplate to cool said base.

9. The cooled deformable mirror of claim 8 wherein said base is constructed from the same material as said faceplate.

10. The cooled deformable mirror of claim 8 further including pusher pads spaced between said faceplate and each of said actuators, each of said pusher pads being positioned to conduct coolant from the apertures in the rear surface of said faceplate to the apertures in said actuators.

11. The cooled deformable mirror of claim 10 wherein said faceplate is constructed from an upper plate containing said mirror surface and a lower plate.

12. The cooled deformable mirror of claim 11 wherein said pusher pads are formed as an integral part of said lower plate.

13. The cooled deformable mirror of claim 7 wherein said faceplate contains at least two enclosed spaces.

14. The cooled deformable mirror of claim 13 wherein the aperture in at least a one of said actuators receives coolant from at least two of said enclosed spaces.

15. The cooled deformable mirror of claim 13 wherein each of said enclosed spaces in said faceplate includes at least one post extending between and contacting said upper plate and said lower plate and positioned to permit coolant to freely circulate therearound.

16. The cooled deformable mirror of claim 13 wherein the aperture in at least a one of said actuators supplies coolant to at least two of said enclosed spaces.

17. The cooled deformable mirror of claim 7 wherein the apertures in said actuators are lined with a dielectric coating to prevent coolant from being diffused into the bodies of said actuators.

18. The cooled deformable mirror of claim 7 wherein said base and said faceplate are made from single crystal silicon.

19. A method for cooling the continuous faceplate of a deformable mirror and the actuators used to selectively deform the faceplate comprising the steps of:
a. manufacturing the faceplate with at least one enclosed space between a front mirror-bearing surface of the faceplate and a rear surface of the faceplate;
b. placing at least two apertures in the rear surface of the faceplate in fluid-communicating relationship with the enclosed space so that coolant may flow into and out of said enclosed space through said apertures;
c. providing a base for said deformable mirror, said base including channels for receiving coolant from an external source and for delivering the coolant back to the external source after the coolant has circulated through the faceplate;
d. circulating coolant toward and away from said base and each of said enclosed spaces in said faceplate through at least two actuators having coolant-carrying apertures passing therethrough, each of said actuators being fastened to said base and to said faceplate with at least a one of said actuators positioned between said base and said faceplate to permit coolant to be introduced from said base through said aperture in said actuator and through at least a first one of said apertures in the rear surface of said faceplate to at least one of said enclosed spaces in said faceplate and with at least a different one of said actuators being positioned between said base and said faceplate to permit coolant to be removed through the aperture in said different actuator from the enclosed spaces in said faceplate into which coolant was introduced through at least a second one of the apertures in the rear surface of said faceplate;

whereby coolant flows from said base through at least one of said actuators and into at least one of said enclosed spaces in said faceplate to cool said mirror surface, and away from said faceplate to said base through at least a different one of said actuators to remove heat from said faceplate and from said actuators.

20. In combination with a deformable mirror having a continuous mirror surface on a faceplate, said faceplate being supported by at least two actuators which are selectively operable to deform said mirror surface, a means for cooling said deformable mirror comprised of:

a. a base manifold for receiving coolant from a source external to said deformable mirror and for distributing said coolant toward said mirror surface and for collecting and directing said coolant toward said external source after the coolant has cooled said mirror surface;

b. an aperture within each of said actuators to permit one or more of said actuators to receive coolant from said base manifold and to deliver said coolant to said faceplate, and to permit one or more others of said actuators to receive coolant from said faceplate and to return said coolant to said base manifold; and c. coolant-distribution means within said faceplate for receiving coolant from the apertures in one or more selected ones of said actuators and distributing said coolant within said faceplate to cool said mirror surface and said faceplate, said coolant distribution means returning said coolant to the apertures within one or more other of said actuators to enable said coolant to be returned to said base manifold through said one or more other of said actuators.

21. The arrangement set forth in claim 20 wherein said coolant-distribution means is comprised of one or more enclosed spaces within said faceplate, each of said enclosed spaces having at least a first aperture to permit coolant to flow into said enclosed space from said aperture within one or more of said actuators and at least a second aperture to permit coolant to be removed from said enclosed space through said aperture within one or more other of said actuators.

22. The arrangement set forth in claim 20 wherein said coolant-distribution means further includes a manifold interposed between said actuators and said enclosed spaces in said faceplate, said manifold being arranged to distribute coolant received from the aperture in one or more of said actuators to one or more of said enclosed spaces abutting said mirror surface and to collect coolant from said enclosed spaces after it has cooled said mirror surface and to return said coolant to the apertures in one or more other of said actuators.

* * * * *